United States Patent Office 3,152,986
Patented Oct. 13, 1964

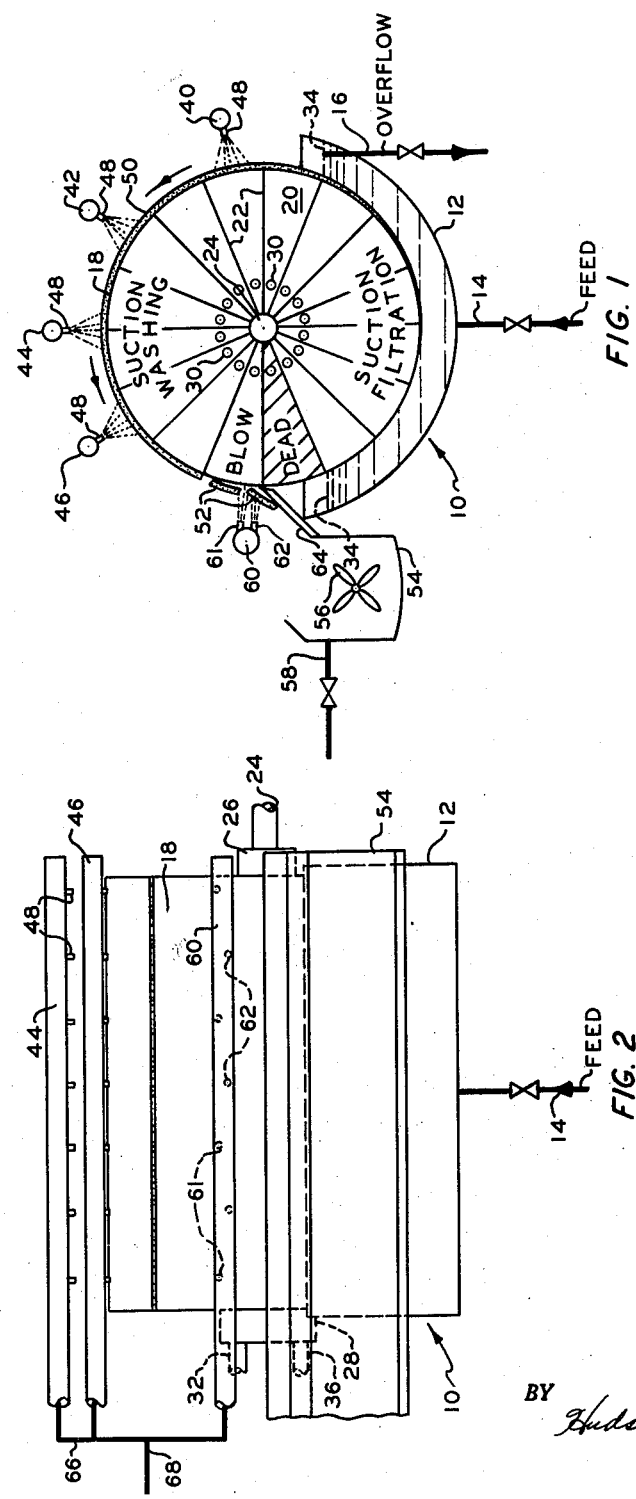

3,152,986
FILTERING PROCESS AND APPARATUS
William O. Bice, Grants, N. Mex., and Robert A. Koble, Bartlesville, Okla., assignors to Phillips Petroleum Company, a corporation of Delaware
Filed Aug. 3, 1960, Ser. No. 47,176
6 Claims. (Cl. 210—67)

This invention relates to an improvement in rotary drum type suction filters and to a process for operating such filters.

Rotary type drum suction filters are utilized for continuously filtering various types of slurries or mixtures of particulate solids and liquids. A specific type of filter comprises a perforate drum covered with a filtering cloth, the drum being partially submerged in a reservoir of the slurry to be filtered. Suction is applied thru the interior of the drum to the portion of the filtering cloth submerged in the slurry and to a substantial section of the cloth above the liquid level in the reservoir. Water or other wash liquid is applied to the cake formed on the cloth during passage of the filtrate therethru from the reservoir. The suction applied to the inside of the drum and to the filter cake above the reservoir forces wash liquid thru the cake into the drum. The cake is blown off the cloth on the downwardly moving side of the drum above the reservoir by injecting gas into a separate section of the drum so that gas blows out thru successive longitudinal sections of the filter cloth as these sections pass thru the blowing area. The thus removed cake falls into a receiver outside the reservoir and is further treated in any suitable manner.

In many filtering applications, fine particles of solid material remain on the filter cloth after removal of the cake and these fine particles tend to blind the filter cloth and interefere with efficient filtering. It is necessary to more or less frequently shut down the filter and clean the cloth to remove the blinding material.

To illustrate, in the filtering of leached pulp in the recovery of uranium values from uranium ore to recover the pregnant liquor from the leached ore there is a slime comprising aqueous liquid organic material and extremely finely comminuted clay and ore particles on the filter cloth after removal of the cake. If not removed, this slime functions as a "blinding" material which interferes with the filtering process and requires shutdown for cleaning the filter cloth. This invention is concerned with an improvement in filtering which eliminates the necessity for filter shutdown to effect this cleaning.

Accordingly, it is an object of the invention to provide an improved drum type rotary suction filter and a continuous filtering process. Another object is to reduce blinding of the filter cloth in the continuous operation of a suction type rotary drum filter. A further object is to increase the efficiency of a suction type rotary drum filter. It is also an object of the invention to improve filtering efficiency in the recovery of uranium solutions from uranium pulp in uranium ore processing. Other objects will become apparent to one skilled in the art upon consideration of the accompanying disclosure.

A broad aspect of the invention comprises directing high velocity sprays of washing liquid onto the filter cloth of a continuously operated rotary drum type suction filter in a longitudinal section on the downwardly moving side of the drum while blowing and after removal of the cake from the cloth and before movement of said section into the filter reservoir. This wash liquid clears the filter cloth and prepares the same for the easy passage of liquid therethru from the reservoir into the drum. The wash liquid directed onto the cloth, together with the removed cake are caught by a doctor blade positioned obliquely with its upper edge close to or just lightly touching the filter cloth and its lower edge within or directly above a receiving vessel so as to deliver these materials thereto.

The invention is particularly applicable to the filtering of leached uranium ore pulp. In the recovery of uranium values from uranium ore, the ore is ground in a ball mill with sodium carbonate and bicarbonate and with water to form an aqueous slurry of ground ore and carbonates. The finely divided ore in slurry form is thickened and then passed to a Pachuca or leaching vessel where it is steam heated and air agitated to leach the uranium values from the ore. The leached pulp (pregnant liquor plus the leached ore) is passed thru the first filter stage of a series of three stages of rotary vacuum drum filters. In this first filter stage, the majority of the pregnant liquor is separated from the leached ore and the filtrate is passed, after clarifying, to a uranium precipitation step where practically all of the uranium is recovered as $Na_2U_2O_7$. The cake formed in the first filter stage is repulped with water or with washing solution comprising the filtrate from the third filter stage of the series and the repulped solids are passed to the second filter stage for recovery of residual uranium values therefrom. In this second filter, the cake is washed with barren solution recovered from the uranium precipitation step after being subjected to recarbonation by contact with flue gas. The filtrate from the second filter is passed to the ball mill in which the ore is ground so that uranium values in the filtrates of the various stages are recovered somewhere in the process. Again the cake is repulped with barren solution or added water and passed to the third filter stage in the series for further washing and recovery of substantially all of the residual uranium solution therein. The filter cake on the third stage filter is washed with water and the filtrate is passed to the first filter stage of the series as wash liquid. The cake, now substantially denuded of uranium values is repulped and pumped to discard as tailings.

The invention is advantageous when applied to any one of the three filtering stages of the uranium recovery process in that it prevents blinding of the filter cloth and increases the on-stream time of the filters without shut downs for cleaning of the filter cloth and permits maximum use of wash liquid.

A more complete understanding of the invention may be had by reference to the accompanying schematic drawing of which FIGURE 1 is a transverse cross section of a rotary vacuum filter illustrating a preferred embodiment of the invention and FIGURE 2 is an elevation of the filter of FIGURE 1.

Referring to the drawing, a rotary vacuum filter 10 comprises a reservoir 12 having a feed inlet 14 and an overflow pipe 16 which controls the liquid level in the reservoir. The filter is provided with a cylindrical drum 18 which is divided into separate sections 20 by imperforate radial partitions or dividers 22. The drum rotates on a shaft 24 supported on the reservoir on each end by bearings, one of which is designated 26 and the other is within element 28 which also houses a slide valve of conventional construction.

Each of sections 20 is provided with an inlet conduit 30 thru the end of the drum and these conduits are connected with or open to suction line 32 when in the suction filtration section within the reservoir and particularly below liquid level 34. The conduits 30 are also connected with suction line 32 when in the suction washing position shown in FIGURE 1. A gas pressure line 36 feeds air thru conduits 30 into section 20 when conduit 30 of any particular section is in the blow location shown in FIGURE 1. A dead space is provided between the blow and suction filtration sections.

The drum 18 is provided with filter cloth on its cylindrical surface which can be fabricated of wool, silk, cotton, linen, synthetic fibers (such as glass, nylon, Orlon, Dacron, etc.) or cloth woven of metal or alloy strands. The particular filtering job to be accomplished determines the type of filtering cloth to be utilized.

Conduits 40, 42, 44, and 46 supply washing liquid to jets or nozzles 48 positioned at regular intervals along the conduits and directed substantially radially onto the drum, particularly onto filter cake 50. The filter cake is accumulated on the filter cloth or surface of the drum in the reservoir because of the suction applied therein to sections 20, whereby filtrate enters sections 20 leaving a cake of solids on the filter cloth which increases in thickness until a given section passes upwardly out of the liquid in the reservoir. The filter cake is then washed by water or other wash liquid or solution forced thru jets 48 and the wash liquid is sucked into the drum thru the cake as it passes under each row of jets. As the cake on any given section reaches the blow position, a jet of air from conduit 36 enters said section thru conduit 30 and blows the cake off this section, as shown at 52, and the removed cake falls into receiver 54 which is provided with agitator 56 and supplied with water or repulping liquid thru line 58. In this way receiver 54 serves as a repulper so that the cake or residual ore can be pumped as a slurry.

The most important feature of the invention is in the location of conduit 60 and directing of jets 61 and 62 onto the cake-free filter cloth while over the blow area and the positioning of doctor blade 64 obliquely with the upper edge close to or just touching the filter cloth on the drum. With this arrangement, the slime comprising blinding particles of ore and/or clay in the ore are washed from the filter cloth and the washings are drained into receiver 54, thereby avoiding the passage of the liquid and minute solids into the reservoir to further complicate the filtering process. Wash liquid thus does not dilute the filtrate.

It is essential to wash the filter cake thoroughly, particularly, in the third filter of the series in order to avoid leaving in the tailings any valuable uranium. Hence, it is highly advantageous to pass as much wash water thru conduits 40, 42, 44, and 46 as possible without upsetting the delicate chemical balance of solutions with which the mill must operate. In other words, there is a maximum amount of water which can be introduced to the filtrate of the third filter without upsetting the concentration balance of the pregnant liquor passing to the uranium precipitation step. It should be noted that the filtrate from the third filter stage is utilized as the wash liquid in the first filter stage from which the filtrate is the pregnant liquor carrying about 95 percent of the uranium originally contained in the ore. It is, therefore, highly advantageous to wash the cake with the maximum tolerable amount of water and to prevent washings from the freed cloth from entering the reservoir to further dilute the filtrate. An additional benefit is derived from passing the slime and blinding particles of ore and clay into the repulper instead of recycling them back to the filter cloth thru the reservoir where they cause blinding of the filter. In fact, a uranium mill was operated with the wash nozzles 61 and 62 positioned below the doctor blade 64 so that the washings were recovered in the reservoir and this arrangement and method of operation proved unsatisfactory. The wash nozzles were placed substantially in the position shown in the drawing and the mill has been operated in this fashion for several months entirely satisfactorily.

Jets 61 and 62 are positioned in staggered or alternate arrangement along conduit 60 as shown in FIGURE 2. The nozzles direct a fan shaped spray of water at high pressure such as 40 to 60 p.s.i.g. onto the cloth thereby effectively washing slime and fine blinding material therefrom. In the arrangement in use conduit 60 is 2" in diameter and is positioned so that the delivery end of the nozzles or jets 61 and 62 are about 5" from the drum, with jets 61 being spaced about 5" from jets 62 longitudinally of the conduit. The two rows of jets are about 1" apart from center to center and each jet is ¼" in diameter. The lower row of jets is just above the level of the upper edge of the doctor blade.

The wash conduits are connected with a common header 66 which connects with a water spray line 68. In some applications, it will be desirable to supply one type of wash liquid to conduits 40, 42, 44, and 46 and a different type of wash liquid to conduit 60. In this event, conduit 60 is connected with a different source of liquid. Of course, it is to be understood that water or any suitable type of wash liquid may be utilized with the apparatus of the invention. As noted in connection with the uranium mill process, barren solution is utilized as the wash liquid to conduits 40, 42, 44, and 46, while filtrate from the third stage filters is utilized in the first stage filters as the wash liquid. The apparatus and process of the invention have valuable application to all types of filtering processes in which blinding of the filter cloth is a problem. Washing may be continuous or intermittent.

Certain modifications of the invention will become apparent to those skilled in the art and the illustrative details disclosed are not to be construed as imposing unnecessary limitations on the invention.

We claim:

1. A process for continuously filtering a slurry of fine solids to separately recover solids and liquid therefrom said solids and liquid normally forming a slime on a filtering cloth which comprises the steps of (1) feeding said slurry to a feed reservoir in the bottom of a continuous rotary filter provided with a cloth covered perforate drum; (2) forcing slurry liquid thru said cloth into a lower filtering section of said drum to form a cake of solids thereon; (3) washing said cake on an upper section of said drum as the next step immediately following said lower filtering section by impinging wash liquid free of solids directly on the cake deposited in step (2) and forcing said liquid thru said cake and cloth into said drum; (4) withdrawing filtrate and wash liquid substantially free of cloth washing liquid of subsequent step (6) from inside said drum; (5) dislodging substantially all of the washed cake from a downward moving section of said cloth immediately following said upper section by blowing gas outwardly therethru; (6) washing said cloth after cake is removed by directing a spray of solids-free wash liquid onto the cloth along the lowermost section of the blown area so as to remove said slime from said cloth; and (7) scraping said cloth just below the washed area by means of a doctor blade so as to direct substantially all of the removed cake, slime, and wash liquid to a recovery zone outside of said reservoir for complete removal thereof from said filter.

2. A process for continuously filtering a slurry of leached pulp from uranium ore in pregnant uranium-containing liquor to separately recover said pulp and said liquor therefrom, said pulp normally forming a slime on said cloth, which comprises the steps of (1) rotating a cloth-covered drum-type filter with the lower section thereof immersed in said slurry within a feed reservoir; (2) as the sole cake-forming step, forcing filtrate into said drum thru said cloth while in said slurry to form a cake of said pulp on said cloth; (3) as the next step, washing the cake on the upper section of said drum immediately following said lower section by spraying wash liquid free of solids directly on the cake formed in step (2) and forcing said liquid by suction thru said cake and cloth into said drum; (4) recovering filtrate and wash liquid substantially free of cloth washing liquid of subsequent step (6) from said drum; (5) blowing substantially all of said cake off successive longitudinal sections of said cloth on the downwardly moving section of said drum immediately following said upper section by blowing gas outwardly thru said cloth; (6) washing said cloth with solids-free water along the lowermost portion of the blown section and before same enters said slurry by directing high speed jets of the wash liquid thereon along the lowermost portion of the blown section so as to remove said slime; and (7) scraping said cloth with a doctor blade just below the washed section so as to catch substantially all of the cloth wash liquid, slime, and removed cake outside of said reservoir as they fall from said cloth and disposing the caught material outside of said filter.

3. Apparatus for continuous filtration of solids from a liquid slurry which normally forms a slime on a filter cloth comprising in combination (1) a drum provided with a filtering cloth and rotatable about a horizontal axis; (2) a single reservoir about the lower section of said drum adapted to maintain said slurry in contact with said cloth; (3) a feed inlet to said reservoir; (4) means for withdrawing liquid from said slurry thru said filter cloth into and thru said lower section of said drum so as to form a cake of solids on said cloth; (5) means for jetting washing liquid free of cake onto said cake on a substantial wash section of said drum immediately following said lower section; (6) means for sucking said wash liquid thru said cake and cloth on said wash section; (7) an imperforate doctor blade directly in contact with the filter cloth along a longitudinal section of the down turning side of said drum said blade sloping downwardly away from said drum so as to direct substantially all of the cake and cloth washing liquid from element (9) into the receiver hereinafter defined; (8) means for blowing gas radially outwardly thru a longitudinal section of said cloth immediately following said wash section and preceding said doctor blade to remove substantially all of the cake from said cloth; (9) liquid spray means directed against the cake-free filter cloth just above said doctor blade on the lowermost portion of the blown longitudinal section for washing said cloth after substantially all of the cake is removed to remove slime therefrom; (10) and a receiver for cake and washings separate from said reservoir and positioned to receive substantially all of the drainage from said doctor blade, said receiver having a disposal line leading away from said filter.

4. The process of claim 2 wherein said cake is washed with the maximum amount of water which can be tolerated in said liquor, and said cloth is washed with water.

5. The apparatus of claim 3 wherein said spray means comprises a conduit extending longitudinally of said drum provided with regularly spaced nozzles directed onto said longitudinal section and said receiver comprises a U-shaped trough provided with an agitator for repulping said cake.

6. The apparatus of claim 5 wherein said nozzles are positioned in a double row spaced alternately in the rows to cover a complete longitudinal section of said cloth with sprayed liquid.

References Cited in the file of this patent
UNITED STATES PATENTS

| | | |
|---|---|---|
| 2,268,788 | Wanner et al. | Jan. 6, 1942 |
| 2,598,606 | Robison | May 27, 1952 |
| 2,839,194 | Lopker et al. | June 17, 1958 |